(12) United States Patent
Marlow

(10) Patent No.: US 6,273,197 B1
(45) Date of Patent: Aug. 14, 2001

(54) METHOD AND APPARATUS FOR A SELF-PROPELLED GROUND AERATOR

(76) Inventor: Audie Marlow, 109 Carnes Dr., Marietta, GA (US) 30008

( * ) Notice: Subject to any disclaimer, the term of this patent is extended or adjusted under 35 U.S.C. 154(b) by 0 days.

(21) Appl. No.: 09/360,968

(22) Filed: Jul. 27, 1999

(51) Int. Cl.$^7$ ............................. A01B 45/02; A01B 35/20
(52) U.S. Cl. ............................. 172/21; 172/42; 172/122; 172/123; 172/125
(58) Field of Search .................................. 172/15, 17, 13, 172/21, 22, 41, 42, 43, 68, 69, 79, 122, 123, 125

(56) References Cited

U.S. PATENT DOCUMENTS

| | | |
|---|---|---|
| 1,887,334 | 11/1932 | Spaeth . |
| 2,244,099 | 6/1941 | Chase . |
| 2,545,059 | 3/1951 | Ward . |
| 2,778,291 | 1/1957 | Kerns . |
| 4,336,760 | 6/1982 | Cohen et al. . |
| 4,550,783 | 11/1985 | Hansen . |
| 5,014,791 | 5/1991 | Kure . |
| 5,398,768 | 3/1995 | Staples . |
| 5,398,769 | 3/1995 | Staples . |

*Primary Examiner*—Christopher J. Novosad
(74) *Attorney, Agent, or Firm*—Patent Focus, Inc.; Richard C. McComas

(57) ABSTRACT

The present invention is a self-propelled ground aerating system. The system comprises, in general, a wheeled platform that has disposed thereon a power pack, a steering mechanism, a hopper for distributing materials, and a spiked drum. The spikes disposed on the drum are selectively positioned to engage the ground at a selected angle. The depth of penetration of the spikes into the ground may also be selected. The power pack provides the required power to a drive mechanism which in turn provides power to rotate the spiked drum thus propelling the present invention.

14 Claims, 5 Drawing Sheets

METHOD AND APPARATUS FOR A SELF-PROPELLED GROUND AERATOR

FIELD OF THE INVENTION

The invention relates, in general, to a method and apparatus for aerating soil. In particular the invention relates to a method and apparatus for a self-propelled ground or soil aerator. More particularly the invention relates to a spiked drum operationally mounted onto a platform. The platform has a steering handle operationally mounted thereto for steering the apparatus.

BACKGROUND OF THE INVENTION

Ground or soil aeration has changed over the years. Originally, soil aeration was accomplished by a farm type tractor pulling or towing a rather large roller. The roller would have ridges or spikes inserted in a random pattern or they would be inserted in horizontal lines. The aerator itself presented little problem for the tractor to pull or tow. If the aerator became wedged or stuck in the soil, the tractor would simply pull the aerator free.

Self-propelled aerators were developed to meet the need for a less expensive way to aerate soil without the use of large farm type equipment. Typically, a motor of some type was mounted onto a wheeled platform along with a spiked drum or a series of spiked wheels. The motor would drive the drum or wheels and propel the wheeled platform forward.

Self-propelled aerators that derive their forward or reverse momentum from the aerator portion of the apparatus tend to be uncontrollable. Steering, for example, becomes impossible because the rotating aerator has a tendency to dig-in when certain types of soil are encountered. For small irregular sized plots of ground steering of the aerator becomes paramount.

Attempts in the past to correct this problem involved aligning the spikes on the aerator horizontally with the ground surface. This attempt yielded a ground aerator that would jerk or jump from one row of spikes to another as the aerator rotated thus exasperating the user trying to steer the aerator. If the horizontal rows of spikes were placed closer together, the desired ground aeration would suffer. If the spikes were randomly placed about the drum, the desired ground aeration would suffer because to aerated holes would overlap or there would be an absence of aerated holes in the ground.

One such attempt incorporated a fertilizer machine with a ground aerator, U.S. Pat. No. 1,887,334 issued to Spaeth on May 14, 1931. The Spaeth patent discloses a ground aerator that has an aerating drum with spikes horizontally aligned on its surface. The fertilizer hopper is positioned above the spiked drum and is powered by the rotating drum. When the drum rotates the spikes, an engaged mechanical arm allows the contents of the hopper to be spread over the area traversed by the spiked drum. The Spaeth's ground aerator relies on the horizontal alignment of the spiked drum to propel the aerator and operate the metering mechanism located in the hopper.

Another attempt is U.S. Pat. No. 2,545,059 issued to Ward on Jun. 3, 1948 discloses a ground aerator and a material spreading machine that is self-propelled. The Ward patent discloses a spiked drum, a hopper, and a metering device for dispensing the material from the hopper. The Ward patent like the Spaeth patent relies on the horizontal alignment of the spikes attached to the drum.

An example of the random placement of spikes on the surface of an aerator is U.S. Pat. No. 2,778,291 issued to Kerns on Oct. 19, 1954. Kerns's patent discloses a ground aerator and a material spreading machine that is pulled or towed by a tractor. The material spreading device is positioned to the rear of a spiked surface that engages the ground to aerate. The spikes of the Kerns's patent are placed in channels and the channels are randomly spaced about the surface of the aerator.

It would desirable to have a self-propelled ground aerator that is easy to steer or maneuver on small or irregular sized plots of ground. The desirable aerator would also have the ability to aerate soil in the forward and reverse direction.

SUMMARY OF THE INVENTION

The present invention provides a user with a method and apparatus to successfully aerate ground or soil. The present invention is capable of aerating large, small, or irregular sized plots of ground with equal adaptability. The user navigates the present invention from a position of control. The user, after selecting the direction of movement of the present invention i.e., forward or reverse direction, sets the throttle to a desired speed and simply walks behind the present invention at a comfortable speed while the present invention is propelled in the desired direction aerating the soil. Navigating, entails simply steering the present invention in the desired direction while it is being self-propelled in the desired direction.

The present invention is a self-propelled ground aerator. The self-propelled ground aerator comprises, in part, a substantially rectangular platform that may, if desired, have at least one pivotally mounted ground engaging wheel that provides stability for the platform. The pivotally mounted wheel also aids in the steering of the self-propelled ground aerator. A spiked drum is operationally mounted along one edge of the platform oppositely spaced from the ground engaging wheel. A steering handle is operationally mounted onto the surface of the platform adjacent to the edge oppositely spaced from the spiked drum. A power pack, transmission, and drive-train are operationally mounted onto the surface of the platform intermediate the spiked drum and the steering handle. If desired, a hopper may be operationally mounted above and forward of the spiked drum. The hopper may contain material such as fertilizer that may be dispensed by the self-propelled aerator in motion.

The drum portion is substantially cylindrical, enclosed, and hollow. A port or plug may, if desired, be selectively disposed on the drum allowing access to the interior of the drum. If desired the drum may be filled with a fluid to increase the weight of the drum thereby increasing the penetration depth of the soil during aeration. The surface of the drum has a plurality of spikes mounted along the horizontal length of the drum for penetrating the soil during aeration. The pikes disposed on the surface of the drum are in rows and the rows are selectively angled from the horizontal.

Before operating the present invention the user may, if desired, set the soil penetration depth by adjusting a provided ground engaging plate. The ground engaging plate is attached to at least one selected pair of spikes of each row of spikes on the spiked drum. The user is normally positioned to the rear of the present invention behind the steering handle and shifts the transmission into neutral. The power pack is started and the user shifts the transmission into forward or reverse depending on the desired direction of aeration. The self-propelled aerator is now operational. The user may, if desired, adjust the throttle to a desired walking speed for aeration.

When taken in conjunction with the accompanying drawings and the appended claims, other features and advantages of the present invention become apparent upon reading the following detailed description of embodiments of the invention.

BRIEF DESCRIPTION OF THE DRAWINGS

The invention is illustrated in the drawings in which like reference characters designate the same or similar parts throughout the figures of which.

DESCRIPTION OF THE EMBODIMENTS OF THE PRESENT INVENTION

Figure 1:
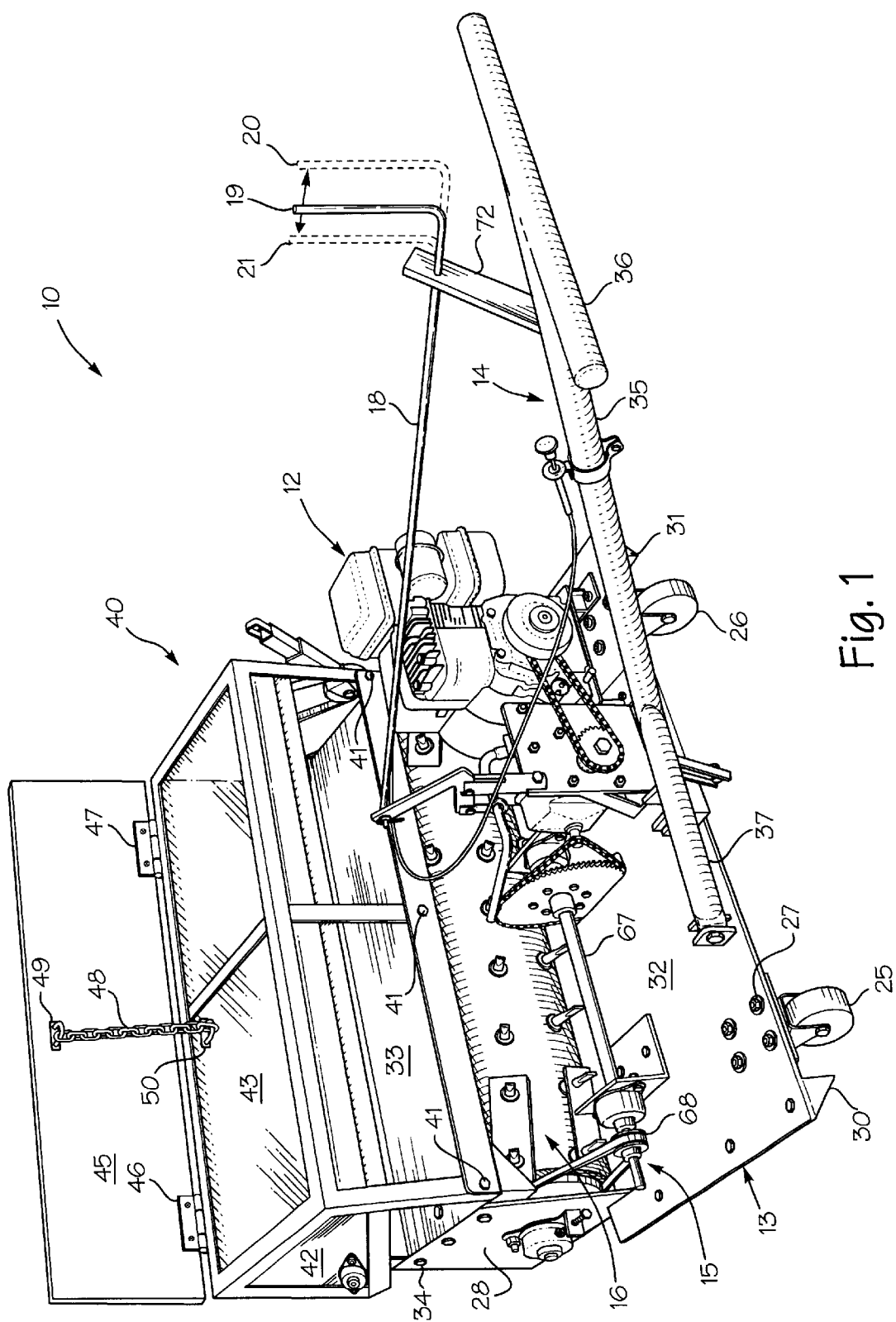
FIG. 1 illustrates a perspective view of the preferred embodiment of the present invention.

Before describing in detail the particular improved self-propelled ground aerator operation in accordance with the present invention, it should be observed that the invention resides primarily in a novel structural combination of conventional components, associated control of the aforementioned ground aerating components, and not in the particular detailed configuration thereof. Accordingly, the structure, command, control, and arrangement of these conventional components have, for the most part, been illustrated in the drawings by readily understandable diagram representations and schematic diagrams. The drawings show only those specific details that are pertinent to the present invention in order not to obscure the disclosure with structural details which will be readily apparent to those skilled in the art having the benefit of the description herein. For example, a power pack 12, FIG. 1 has numerous connections to the present invention 10. Various portions of the power pack's 12 connections to the present invention 10 have been simplified in order to emphasize those portions that are most pertinent to the invention. Thus, the top level system diagram and the schematic diagram illustrations of the Figures do not necessarily represent the mechanical structural arrangement of the exemplary system, and are primarily intended to illustrate major hardware structural components of the system in a convenient functional grouping whereby the present invention may be more readily understood.

An Overview of the Present Invention

The preferred embodiment of the present invention 10 is a self-propelled ground aerator for aerating various compositions of ground or soil. Any composition of soil may be used in conjunction with the present invention 10. Examples of different soil compositions are humus, sandy loam, and a mixture of sand and soil.

The self-propelled ground aerator of the present invention 10 may, if desired, be comprised of a wheel mounted platform 13, FIG. 1 that has a steering handle 14 mounted along one edge and a spiked or tined drum mounted along the other edge opposite the steering handle. A drive-train 15 is mounted intermediate the power pack 12 and the spiked drum 16. A detachable hopper is mounted adjacent the spiked drum and forward of the wheel mounted platform 13.

In general, an operator or user is positioned to the rear of the steering handle 14. The transmission shift lever 18 is in the neutral position 19 and the power pack 12 is properly started. If desired the user may engage the shift lever to the forward position 21 and the spiked drum 16 begins to rotate in clockwise direction. The clockwise rotation of the spiked drum 16 propels the present invention 10 in a forward direction. If desired the user may engage the shift lever to the reverse position 20 and the spiked drum 16 begins to rotate in counter clockwise direction. The counter clockwise rotation of the spiked drum 16 propels the present invention 10 in a reverse direction.

Figure 2:
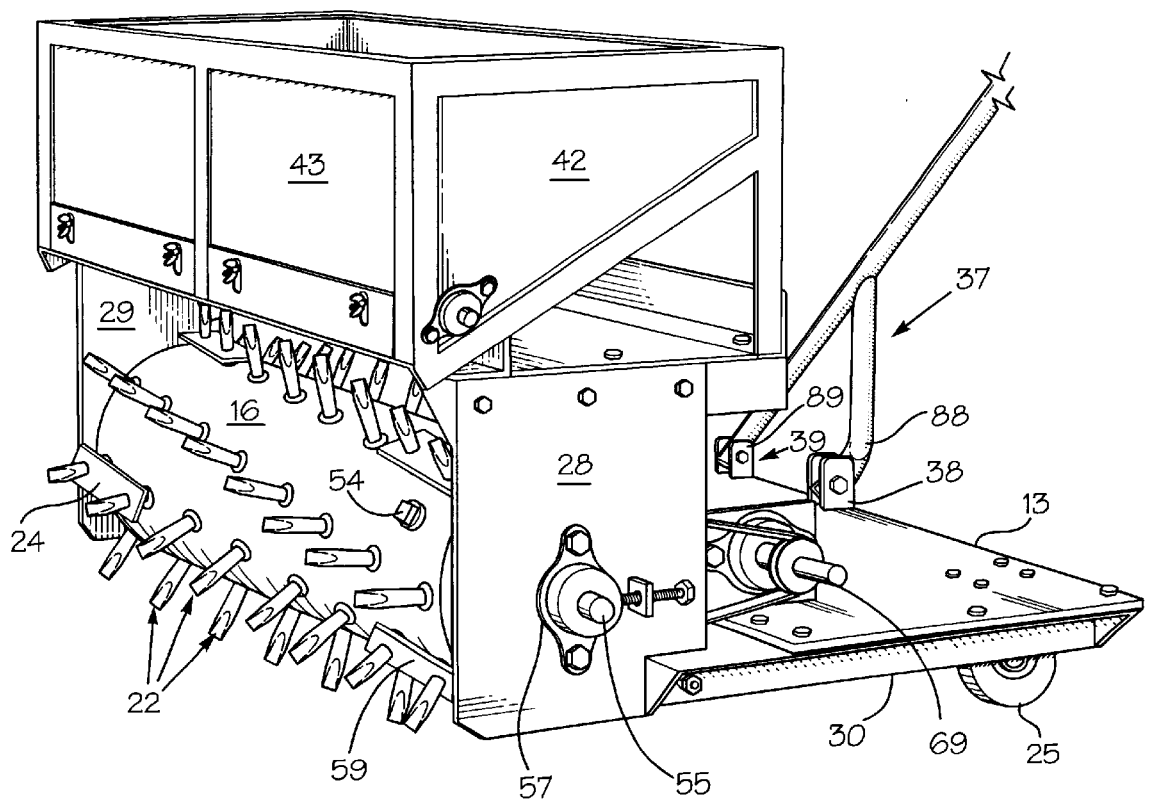
FIG. 2 illustrates a perspective view of a spiked drum FIG. 1.

The spikes 22, FIG. 2 are mounted onto the drum 16 at an angular deviation from the horizontal plain of the drum 16. The angular deviation of spikes 22 provides the drum 16 with a continuous spiraling action when the drum 16 is in motion. The spiraling action engages a selected number of spikes 22 with the ground at any given revolution of the drum 16. The selected number of spikes 22 penetrating the ground during any revolution of the drum 16 enables the present invention 10 to be propelled along the ground rather than digging into the ground. An adjustable ground clearance plate 24 may, if desired, be mounted onto a selected pair of spikes 22. The adjustable ground clearance plate 24 supports, in part, the weight of the drum when aerating in particularly soft soil.

A More Detailed Discussion of the Present Invention

The Wheel Mount Platform and Steering Assembles

The wheel mount platform 13 may, if desired, be fabricated from any type of material that is structurally sound and allows the present invention to operate. Examples of materials used in the construction of the wheel mount platform 13 may be steel, aluminum, plastic, or any composite type material. Preferably, sheet steel having a thickness in the range of $1/16^{th}$ to $3/8^{th}$ of an inch, is used. The wheel-mounted platform may be any convenient geometric shape, preferably substantially rectangular. At least one wheel 25, FIG. 1 is mount onto one side of the platform 13 by any convenient means, preferably by a plurality of nuts and bolts 27. A companion wheel 27 may also be added to the platform 13. The positioning of the wheels 25 and 26 is a matter of choice, preferably towards the rear of the platform for stability and maneuverability of the present invention 10. If desired, the wheels 25 and 26 may be replaced with metal skids pivotally affixed to the platform 13 by any convenient means. Reinforcement bars 30 and 31 may be added to the platform 13 for added support when using minimum gauge steel for the platform fabrication. A pair of substantially rectangular plates 28 and 28 are mounted perpendicular to the top surface 32 of the platform 13 by any convenient means such as welding. The plates 28 and 29 are spaced apart and attached along the forward edge of the platform 13 opposite the steering handle 14. A second substantially rectangular plate 33 is mounted between the upright plates 28 and 29. Together plates 28, 29, and 33 form a U shaped cover over the spiked drum 16.

The steering assembly 14, FIG. 1 may, if desired, be any type of steering mechanism that allows the present invention 10 to function. Preferably, the steering assembly 14 comprises an elongated rod 35 with a T shaped handle affixed to one end. The other end 37 of the rod 35 may, if desired, be forked or have a plurality of prongs extending outward and are attached to the platform 13 to increase the steering capability of the steering assembly 14. An example of this is the end 37 which has two prongs 88 and 89 that are pivotally mounted onto the platform 13 by pin and U brackets 39 and 38, FIG. 2 respectively.

The Detachable Hopper and Spreader Bar Assembly

The detachable hopper 40, FIG. 1 may, if desired, be operationally placed onto plate 33 and secured by nuts and bolts 41. The hopper 40 is a substantially rectangularly frame with sidewalls 42, 43, and 44 forming a substantially triangular shaped interior cavity within the substantially rectangularly framed hopper 40. A lid 45 may, if desired, be added to the hopper 40 to contain the material placed within the hopper 40. The lid 45 is mounted to the hopper 40 by hinges 46 and 47. The hinges 46 and 47 are secured in place by a plurality of nuts and bolts. A chain 48 may, if desired, be added to the lid 45 and hopper 40 to prevent the lid 40 from extending onto the spiked drum 16. The chain is secured in place by U shaped connectors 49 and 50. A slot (not shown) is formed at the vertex of the sidewalls 43 and 44. The slot is positioned above and forwards of the spiked drum 16. The slot allows material placed into the hopper 40 to exit the hopper and be gravity fed to the surface of the ground whereby the spiked drum 16 plants the material into the soil.

Figure 5A:
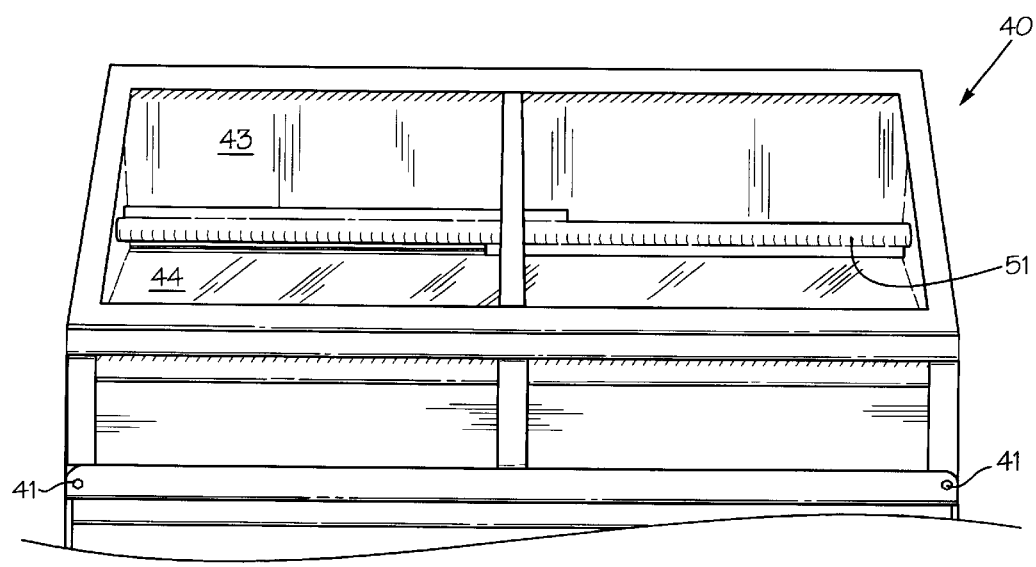
FIG. 5b illustrates a front view diagram of a spreader bar assembly of FIG. 5a, FIG. 6a illustrates a side view diagram of a hopper assembly control arm in position one.
Figure 5B:
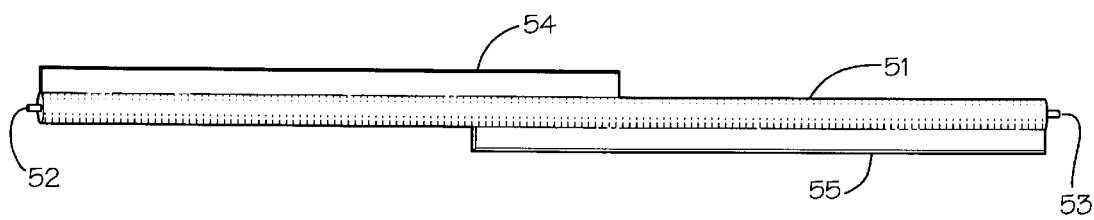

A spreader bar 51, FIG. 5b may, if desired, be added to the hopper 40 to assist in the spreading of the material placed in the hopper 40. The spreader bar 51 is an elongated bar with spindles 52 and 53 axlely mounted to the spreader bar 51. A pair of opposing and over lapping plates 54 and 55 are mounted onto the spreader bar 51 to move or agitate the material placed into the hopper 40. The opposing and overlapping of the plates 54 and 55 are positioned on the spreader bar 51 in such a way as to sufficiently increase the strength of the spreader bar 51.

The Spiked Drum

The spiked drum 16 is a hollow, enclosed, and substantially cylindrical container, fabricated from any convenient material that may be the same or different from the platform 13 material. The spiked drum's 16 outer surface may, if desired, be uniform or smooth. A port or pug 54 is positioned in any convenient place on the spiked drum 16. The plug 54 is sized to allow access to the interior of the spiked drum 16. The spiked drum 16 may, if desired, be filled with a fluid to increase the weight of the spiked drum 16. During aeration of soil, it may be necessary to fill the spiked drum 16 with fluid to increase the penetration of the spikes 22 into the soil. An example of the fill fluid is water. The spiked rum 16 has a spindle 55 mounted on one end of the drum and second spindle 56 oppositely mounted on the other end of the drum. The spindle 55 mounts into a bearing cap 57 affixed to plate 28 and spindle 56 is mounted into a bearing cap 58 affixed to plate 29. The bearing caps 57 and 58 may be mounted to respective plates 28 and 29 by any convenient means like nuts and bolts. The spiked drum 16 is free to rotate in the clockwise or counter clockwise direction in the bearing caps 57 and 58.

A plurality of spikes 22, FIG. 2 may, if desired, be mounted onto the surface of the spiked drum 16. Generally, the spikes 22 are mounted in horizontal rows along the longitudinal length of the drum. The rows of spikes 22 may, if desired, be angularly mounted along the horizontal length of the spiked drum 16. The mounting angle from the horizontal may, if desired, be in the range of 0° (degrees) to about 90° (degrees). Preferably, the mounting angle is 7° (degrees) from the horizontal. The mounting angle allows a selected number of spikes to engage the ground at any one time. With the mounting angle of 7° (degrees) 2 spikes from a given row engage the ground as the spiked drum 16 turns. As the spiked drum 16 continues to rotate the next or adjacent 2 spikes in the same row engage the ground. The angular placement and minimum number of spikes 22 engaging the ground propels the present invention 10 in a straight line along the surface of the ground. The spikes 22 may, if desired, be welded to the surface of the spiked drum 16. The spikes 22 may, if desired, have the ground engaging portion fashioned into a chisel shape or any other shape that allows penetration into the soil. The spikes 22 may also be heat treated to increase the hardness of the spike thereby allowing the chisel end to remain sharp. The spacing of the rows is a matter of choice. Typically, they are spaced to allow ground penetration every 8 inches.

Figures 4A, 4B:
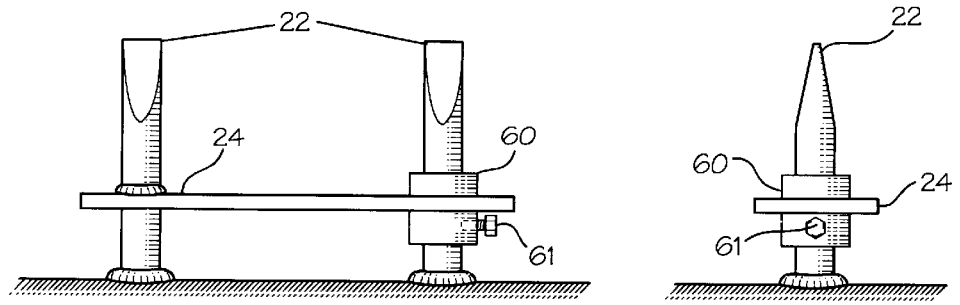
FIG. 4b illustrates an end view diagram of the ground clearance plate and spike assembly of FIG. 4a, FIG. 5a illustrates a front view diagram of a hopper housing of FIG. 1.

An adjustable ground clearance plate 24 may, if desired, be mounted onto a selected pair of spikes 22. Preferably, a second adjustable ground clearance plate 59 is mounted onto a selected pair of spikes 22 within the same row of spikes as the adjustable ground clearance plate 24. If the angular placement of the spikes is 7° (degrees) the adjustable ground clearance plates 24 and 59 are mounted onto 2 spikes, respectively, at opposite ends of a single row of spikes 22. The adjustable ground clearance plates 24 and 59 are adjustable via a locking nut 61 and collar 60, FIG. 4a. A desired soil penetration depth is selected and the ground clearance plates 24 and 59 are adjusted accordingly by loosening nut 61, FIG. 4b setting the desired depth then tightening nut 61. The ground clearance plates 24 and 59 support, in part, the weight of the drum when aerating in particularly soft soil thereby preventing the spiked drum from digging into the soil and stalling the aeration process.

The Power Pack and Drive-Train

The Power Pack

The present invention 10 receives its power from the power pack 12, FIG. 1. The power pack 12 may be any convenient type of power delivery system that produces sufficient power to operate the present invention 10. Examples of power pack 12 are a gasoline motor, diesel motor, or an electric motor. The power pack 12 may be mounted anywhere on the platform surface 32. Preferably, a 3.5 horsepower gasoline motor is sufficient to operate the present invention 10.

The Drive-Train

Figure 3A:
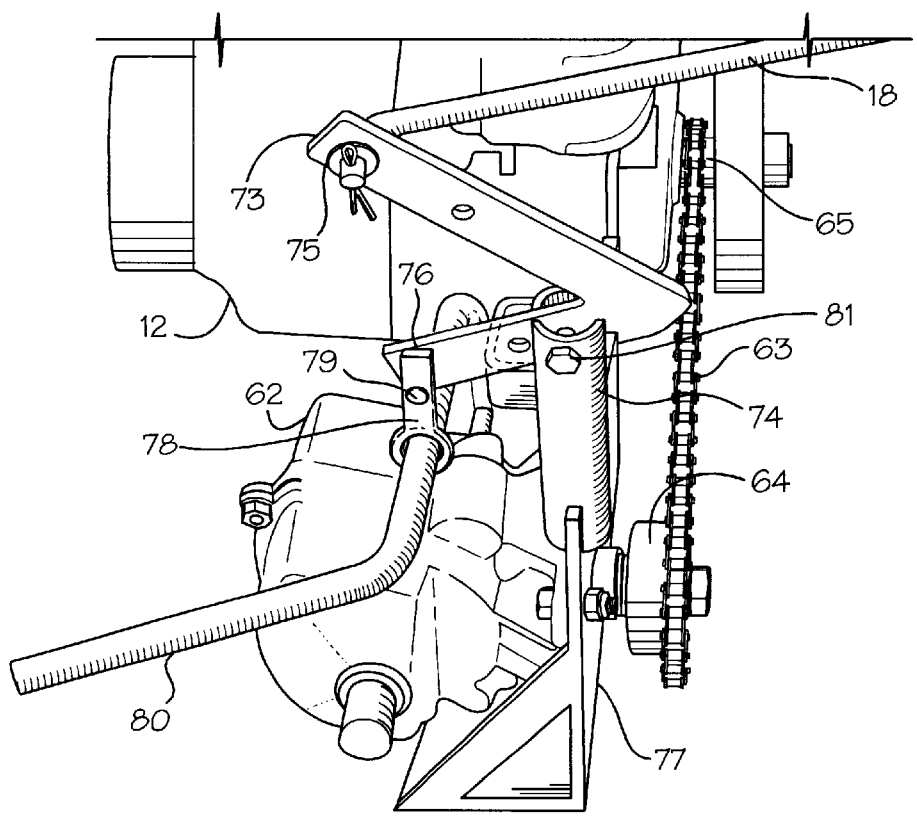
FIG. 3a illustrates a side view diagram of a transmission and motor assembly of FIG. 1.
Figure 3B:
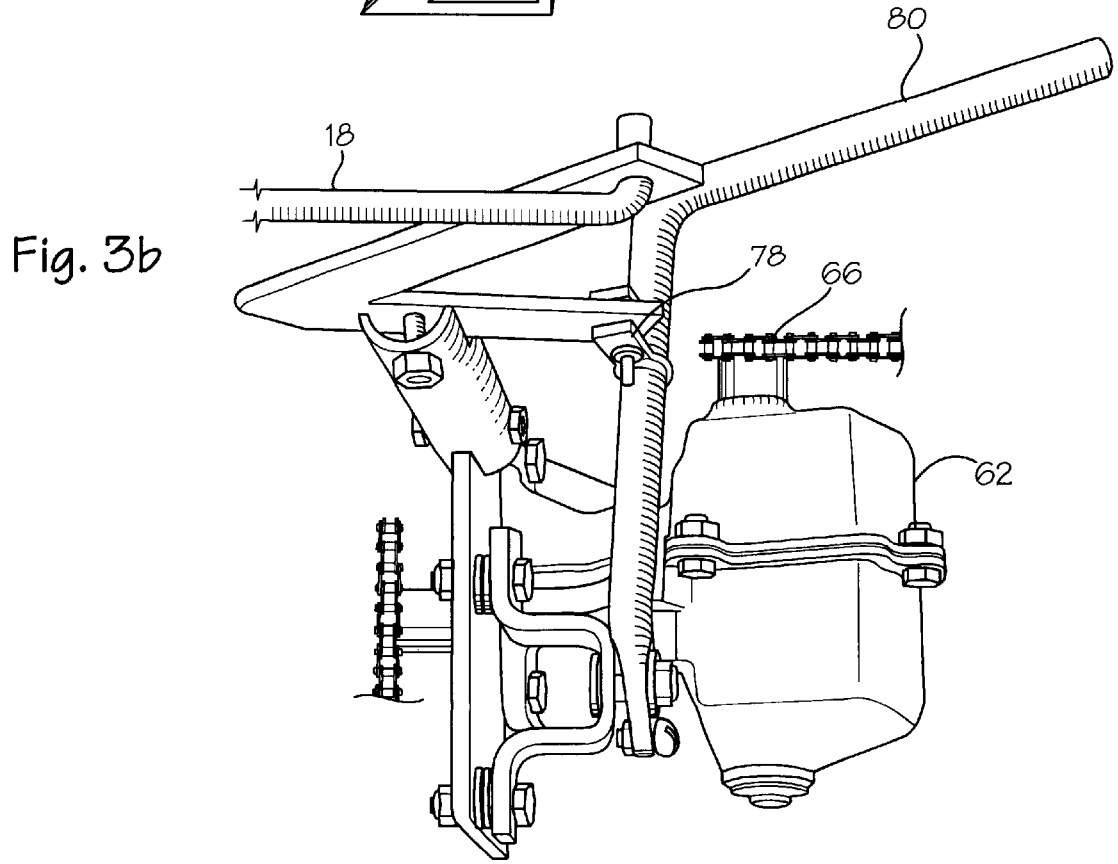
FIG. 3b illustrates a top view diagram of the transmission and motor assembly of FIG. 3a, FIG. 4a illustrates a front view diagram of the ground clearance plate and spike assembly.

The power pack 12 is connected to a transmission 62, FIG. 3a by a chain-drive 63. The transmission is securely mounted onto the surface 32 of the platform 13 in relative proximity to the power pack 12. The chain-drive 63 comprises two properly aligned gears 64 and 65 with a chain inter-linking the gears. The gears 64 and 65 are mounted in such a way as to provide a power transfer ratio of 1.8461 to 1 from the power pack 12 to the transmission 62. A second chain-drive 66 transfers the power from the transmission 62 to an axle 67. The transfer ratio from the transmission 63 to the axle is 9.70 to 1. The axle 67 is mounted on the surface 32 of the platform 13 in close proximity to the spiked drum 16. Each end of the axle 67 has a pulley 68, FIG. 1 and 68, FIG. 2 mounted thereto. The spiked drum 16 has a pulley 70, FIG. 6*b* and 71 (not shown) mounted on respective ends of the spiked drum 16. The pulleys 70, 71 and 67, 68 are properly aligned with their respective counterparts to provide the maximum power transfer from the axle 67, via a plurality of drive belts, to the spiked drum 16. A typical power transfer ratio between the axle 67 pulleys and the spiked drum 16 pulleys is 3.0 to 1.

A shift lever 18, FIG. 1 is mounted along the longitudinal length of the steering handle 14. The shift lever 18 extends approximately from the T shaped handle 36 to the transmission 62. The shift lever 18 traverses bracket 72, which provides support at one end for the shift lever. The other end of the shift lever 18 is pivotally connected to one leg of a substantially V shaped bracket 73 by pin 75. The other leg 76 of the substantially V shaped bracket 73 is pivotally connected to one end of a tubular member 74. The other end of the tubular member 74 is connected to the transmission bracket 77. An elongated member 78 has two oppositely spaced openings disposed in either end of the elongated member 78. The opening on one end may be of any geometric shape that allows the elongated member 78 to freely rotate about pin 79. The opening on the other end may be of any geometric shape that allows an L shaped or "dog-leg" 80 member to traverse.

The L shaped member 80 has one end connected to the transmission 62 and the other end is free-floating. When the shift lever 18 is traversed from the neutral 19 position to the forward 21 position or from the neutral 19 position to the reverse 20 position the V shaped member 73 pivots about pin 81 causing the elongated member 78 to move up or down in the vertical direction in relation to the L shaped member 80. As the elongated member 78 is moved up or down, the L shaped member 80 traverses the opening of the elongated member 78 thereby shifting the transmission 62 from forward 21 neutral 19, or reverse 20.

Figure 6A:
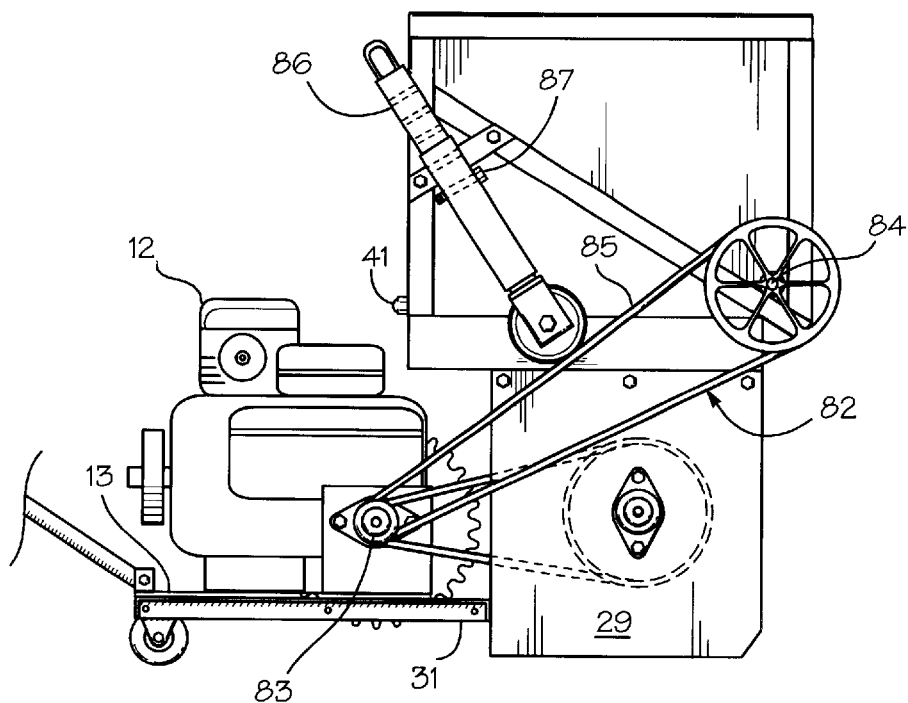
FIG. 6b illustrates a side view diagram of a hopper assembly control arm in position two.
Figure 6B:
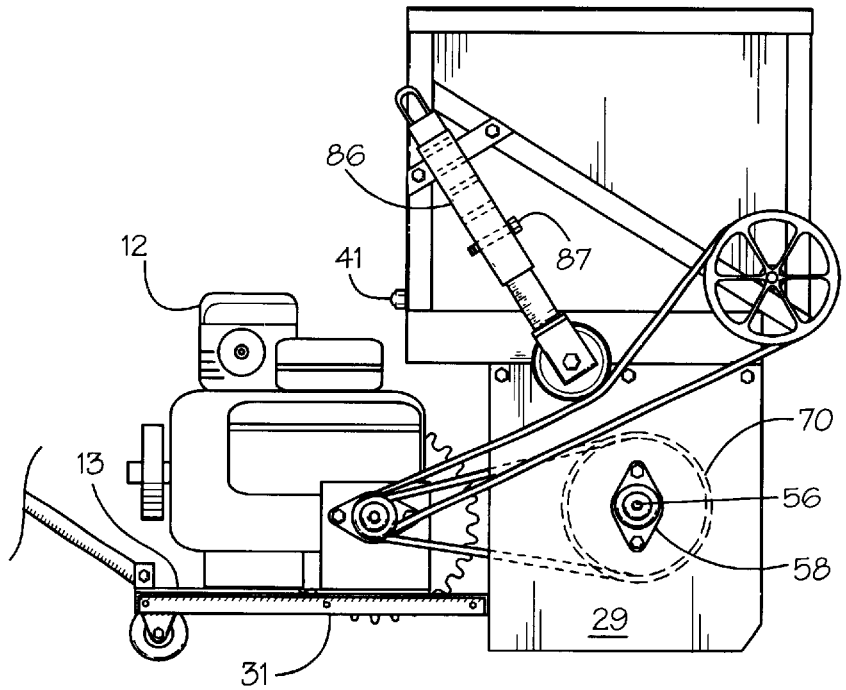

The axle 67 and the spreader bar 54 are connected via a belt driven pulley system 82. The pulley system 82 has one pulley 83 connected to the axle 67 and a second pulley 84 connected to the spreader bar 51. A belt 85 transfers the power from the axle 67 to the spreader bar 51. Typically, the power transfer ratio is about 3 to 1. A spreader activator 86, FIG. 6*b* may, if desired, be engaged to rotate the spreader bar 51. The spreader activator 86, FIG. 6*a* may, if desired, be disengaged to stop rotation the spreader bar 51. The spreader activator 86, FIG. 6*b* in its forward position presses on the belt 85 causing tension or taking up the slack in the belt 85. This action causes the pulley 84, which is attached to the spreader bar 51, to turn in a clockwise direction. When the spreader activator 86, FIG. 6*a* is released or in the reverse position, no tension is applied to the belt 85 and it begins to slip i.e., the spreader bar 51 stops turning. There are a plurality of tension positions to which the spreader activator 86 may be adjusted depending on the desired rate of rotation of the spreader bar 51. The spreader activator 86 may be adjusted by using a pin 87 through a selected slot or hole that traverses the spreader activator 86.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together whereas a screw employs a helical surface, in the environment of fastening wooden parts, a nail and a screw may be equivalent structures.

What is claimed is:

1. A self propelled ground engaging aerator, comprising:
   a) a substantially rectangular platform having at least one depending ground engaging wheel;
   b) a steering handle operationally disposed along one edge of said platform;
   c) a drum operationally disposed along one edge of said platform oppositely spaced from said steering handle;
   d) a plurality of spikes selectively disposed about said drum;
   e) said drum receiving operational power;
   f) a drive-train operationally disposed intermediate said operational power and said spiked drum;
   g) a transmission disposed intermediate said drive-train and said operational power;
   h) an elongated shift lever having one end adjacently disposed to said steering handle, said elongated shift lever's other end operationally disposed to said transmission;
   i) a substantially L shaped gear shifting member having a first end operationally connected to said transmission, said L shaped gear shifting member having a second end adjacently disposed to said elongated shift lever;
   j) an elongated member having a first end with a hole disposed therein, said elongated member having a second end oppositely spaced from said first end, said second end operationally disposed to said elongated shift lever;
   k) said L shaped gear shifting member's second end traversing said hole of said elongated member's first end;
   l) a throttle having one end operationally disposed to said motor, said throttle's other end adjacently disposed along said steering handle;
   thereby the ground engaging aerator is self-propelled along the ground by said spikes selectively disposed about said drum while being steered by said steering handle, the ground engaging aerator shifting operationally from forward, neutral, or reverse with said shifting lever causing said elongated member to traverse along the longitudinal length of said L shaped gear shifting member.

2. A self propelled ground engaging aerator as recited in claim 1 further comprising:
   l) a substantially rectangular ground clearance plate, said plate being operationally disposed to at least one pair of spikes on said spiked drum.

3. A self propelled ground engaging aerator as recited in claim 2 further comprising:

m) a detachable substantially rectangular hopper housing being operationally disposed to said spiked drum, said hopper housing having at least one side wall positioned forward and above said spiked drum;

n) a lid mounted on said hopper housing allowing access to the interior of said hopper housing;

o) a substantially rectangular plate mounted within the interior of said hopper housing, said plate, said lid, and said side wall forming a substantially triangular cavity within the interior of said hopper housing;

p) said hopper having at least one slot along the vertex formed by said side wall and said plate;

q) a n elongated spreading bar operationally disposed along the longitudinal length of said slot;

r) said spreading bar operationally disposed to said drivetrain; thereby material placed within the confines of said hopper housing being gravity fed across said plate towards said slot, and being dispersed by said spreading bar.

4. A self propelled ground engaging aerator as recited in claim 3 wherein said operational power is a motor operationally disposed on said platform.

5. A self propelled ground engaging aerator as recited in claim 4 wherein said steering handle is an elongated shaft having a T shaped portion disposed at one end, said elongated shaft having a second end oppositely spaced from said T shaped portion, said second end being operationally connected to said platform.

6. A self propelled ground engaging aerator as recited in claim 5 wherein said spiked drum having outwardly perturbing spikes, said spikes are selectively arranged in rows along the longitudinal length of said drum.

7. A self propelled ground engaging aerator as recited in claim 6 wherein said rows are selectively spaced from the horizontal along the longitudinal length of said drum.

8. A self propelled ground engaging aerator as recited in claim 7 wherein said selection angle is approximately in the range of 0° (degrees) to about 90° (degrees).

9. A self propelled ground engaging aerator as recited in claim 8 wherein said selection angle is 7° (degrees).

10. A self propelled ground engaging aerator as recited in claim 9 wherein said spikes having the ground engaging portion are chisel shaped.

11. A self propelled ground engaging aerator as recited in claim 10 wherein said chisel shaped spikes are tempered.

12. A self propelled ground engaging aerator as recited in claim 11 wherein said spiked drum has a port disposed thereon for gaining access to said spiked drum' interior.

13. A self propelled ground engaging aerator as recited in claim 12 wherein said ground clearance plate is welded to at least one pair of spikes on said spiked drum.

14. A self propelled ground engaging aerator as recited in claim 13 wherein said ground clearance plate is adjustably disposed to at least one pair of spikes on said spiked drum.

* * * * *